US012645351B2

(12) United States Patent
Lewis et al.

(10) Patent No.: US 12,645,351 B2
(45) Date of Patent: Jun. 2, 2026

(54) PRESENTING CONTENT ITEMS AND PERFORMING ACTIONS WITH RESPECT TO CONTENT ITEMS

(71) Applicant: Google LLC, Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/477,402

(22) Filed: Sep. 28, 2023

(65) Prior Publication Data

US 2024/0036714 A1     Feb. 1, 2024

Related U.S. Application Data

(63) Continuation of application No. 17/543,370, filed on Dec. 6, 2021, now Pat. No. 11,775,152, which is a continuation of application No. 16/807,110, filed on Mar. 2, 2020, now Pat. No. 11,194,454, which is a continuation of application No. 15/601,354, filed on May 22, 2017, now Pat. No. 10,579,235, which is a continuation of application No. 14/179,262, filed on Feb. 12, 2014, now Pat. No. 9,665,251.

(51) Int. Cl.
| | |
|---|---|
| *G06F 3/0482* | (2013.01) |
| *G06F 3/04842* | (2022.01) |
| *H04L 67/12* | (2022.01) |
| *H04L 67/75* | (2022.01) |

(52) U.S. Cl.
CPC ........ *G06F 3/04842* (2013.01); *G06F 3/0482* (2013.01); *H04L 67/12* (2013.01); *H04L 67/75* (2022.05)

(58) Field of Classification Search
CPC .................................................... G06F 18/251
See application file for complete search history.

(56) References Cited

U.S. PATENT DOCUMENTS

| | | | |
|---|---|---|---|
| 8,176,068 B2 | 5/2012 | Kunjithapatham et al. | |
| 8,862,978 B2 | 10/2014 | Evans | |
| 10,135,887 B1 * | 11/2018 | Esser | H04L 65/612 |
| 2005/0019015 A1 | 1/2005 | Ackley et al. | |
| 2006/0262221 A1 | 11/2006 | Yuasa et al. | |
| 2007/0074116 A1 * | 3/2007 | Thomas | G11B 27/10 |
| 2008/0092168 A1 | 4/2008 | Logan et al. | |
| 2008/0281689 A1 | 11/2008 | Blinnikka et al. | |
| 2008/0281699 A1 | 11/2008 | Whitehead | |

(Continued)

*Primary Examiner* — Di Xiao

(74) *Attorney, Agent, or Firm* — Lowenstein Sandler LLP

(57) ABSTRACT

A method for presenting content items includes receiving a first content item from a first user device of a first user of a content sharing platform. The first content item references an additional content item through one or more actions performed by the first user on the first user device. In response to a subsequent request of a second user of the content sharing platform for the first content item hosted by the content sharing platform, providing, for display in a graphical user interface (GUI) of a second user device of the second user, a first GUI portion to display the first content item and a second GUI portion to present the additional content item. The one or more actions are caused to be performed in the GUI of the second user device during a playback of the first content item.

20 Claims, 8 Drawing Sheets

(56)                References Cited

U.S. PATENT DOCUMENTS

| | | | |
|---|---|---|---|
| 2008/0288983 A1 | 11/2008 | Johnson et al. | |
| 2009/0119166 A1 | 5/2009 | Taylor et al. | |
| 2009/0167552 A1 | 7/2009 | Sato et al. | |
| 2009/0187825 A1* | 7/2009 | Sandquist | G06F 40/169 |
| | | | 715/719 |
| 2009/0319911 A1 | 12/2009 | McCann et al. | |
| 2010/0077319 A1 | 3/2010 | Xu et al. | |
| 2010/0293190 A1 | 11/2010 | Kaiser et al. | |
| 2012/0075325 A1 | 3/2012 | Kurtyka et al. | |
| 2012/0159327 A1 | 6/2012 | Law et al. | |
| 2013/0047178 A1* | 2/2013 | Moon | H04N 21/4722 |
| | | | 725/31 |
| 2014/0164930 A1 | 6/2014 | Lieb et al. | |
| 2014/0193140 A1* | 7/2014 | Fliderman | G11B 27/005 |
| | | | 386/343 |
| 2014/0204962 A1 | 7/2014 | Park et al. | |
| 2014/0317660 A1 | 10/2014 | Cheung et al. | |

* cited by examiner

COMPUTING DEVICE 700

PRESENTING CONTENT ITEMS AND PERFORMING ACTIONS WITH RESPECT TO CONTENT ITEMS

CROSS-REFERENCE TO RELATED APPLICATIONS

This application is a continuation of U.S. patent application Ser. No. 17/543,370, filed Dec. 6, 2021, entitled "PRESENTING CONTENT ITEMS AND PERFORMING ACTIONS WITH RESPECT TO CONTENT ITEMS", which is a continuation of U.S. patent application Ser. No. 16/807,110, filed Mar. 2, 2020, entitled "PRESENTING CONTENT ITEMS AND PERFORMING ACTIONS WITH RESPECT TO CONTENT ITEMS", now U.S. Pat. No. 11,194,454, which is a continuation of U.S. patent application Ser. No. 15/601,354, filed May 22, 2017, entitled "PRESENTING CONTENT ITEMS AND PERFORMING ACTIONS WITH RESPECT TO CONTENT ITEMS", now U.S. Pat. No. 10,579,235, which is a continuation of U.S. patent application Ser. No. 14/179,262, filed Feb. 12, 2014, entitled "PRESENTING CONTENT ITEMS AND PERFORMING ACTIONS WITH RESPECT TO CONTENT ITEMS", now U.S. Pat. No. 9,665,251, which are all hereby incorporated by reference in their entirety.

TECHNICAL FIELD

Embodiments of the present disclosure relate to the field of content items and, more particularly, to mechanisms for presenting content items and performing actions with respect to content items.

BACKGROUND

On the Internet, social networks allow users to connect to and share information with each other. Many social networks include a content sharing aspect that allows users to upload, view, and share content such as content items. Such content items may include audio clips, movie clips, TV clips, and music videos, as well as amateur content such as video blogging, short original videos, pictures, photos, other multimedia content, etc. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos. Users may use computing devices (such as smart phones, cellular phones, laptop computers, desktop computers, netbooks, tablet computers) to use, play, and/or consume content items (e.g., watch digital videos, and/or listen to digital music).

A content sharing platform can include one or more channels that may be viewable over the Internet. A channel is a mechanism for providing certain media items and/or for providing access to media items to subscribers. Media items for the channel can be selected by a user, uploaded by a user, selected by a content provider, or selected by a broadcaster. Users can subscribe to one or more channels. Upon subscribing, the user can view his or her subscriptions from the homepage of the content hosting site or from a user interface by clicking on a "Subscriptions" link/button. With many channels and even more media items associated with a content sharing platforms or viewable over the Internet, it may be difficult for a user to find new media items to consume and/or to decide which media items to consume.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method of presenting and/or providing content items is presented. The method may receive a first content item from a first user of a first user device and identify a set of actions performed by the first user on the first user device. Each action from the set of actions may be associated with a corresponding additional content item from a set of additional content items and each additional content item from the set of additional content items may be associated with a corresponding portion of the first content item. The method also provides data indicative of the set of additional content items to a client device and a graphical user interface (GUI) to the client device. The GUI may include a first GUI portion to present the first content item and a second GUI portion to present the set of additional content items. The method may also cause one or more actions from the set of actions to be performed on the GUI on the second user device.

In another embodiment, a method of presenting and/or providing content items is presented. The method receives a first content item from a content sharing platform and receives data indicative of a set of actions from the content sharing platform. Each action from the set of actions may be associated with a corresponding additional content item from set of additional content items and each additional content item from the set of additional content items may also be associated with a corresponding portion of the first content item. The method also provides providing a graphical user interface (GUI) including a first GUI portion to present the first content item and a second GUI portion to present the set of content items. The method may also cause one or more actions from the set of actions to be performed in the GUI.

In additional embodiments, computing devices for performing the operations of the above described embodiments are also implemented. Additionally, in embodiments of the disclosure, a computer readable storage media may store instructions for performing the operations of the embodiments described herein.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
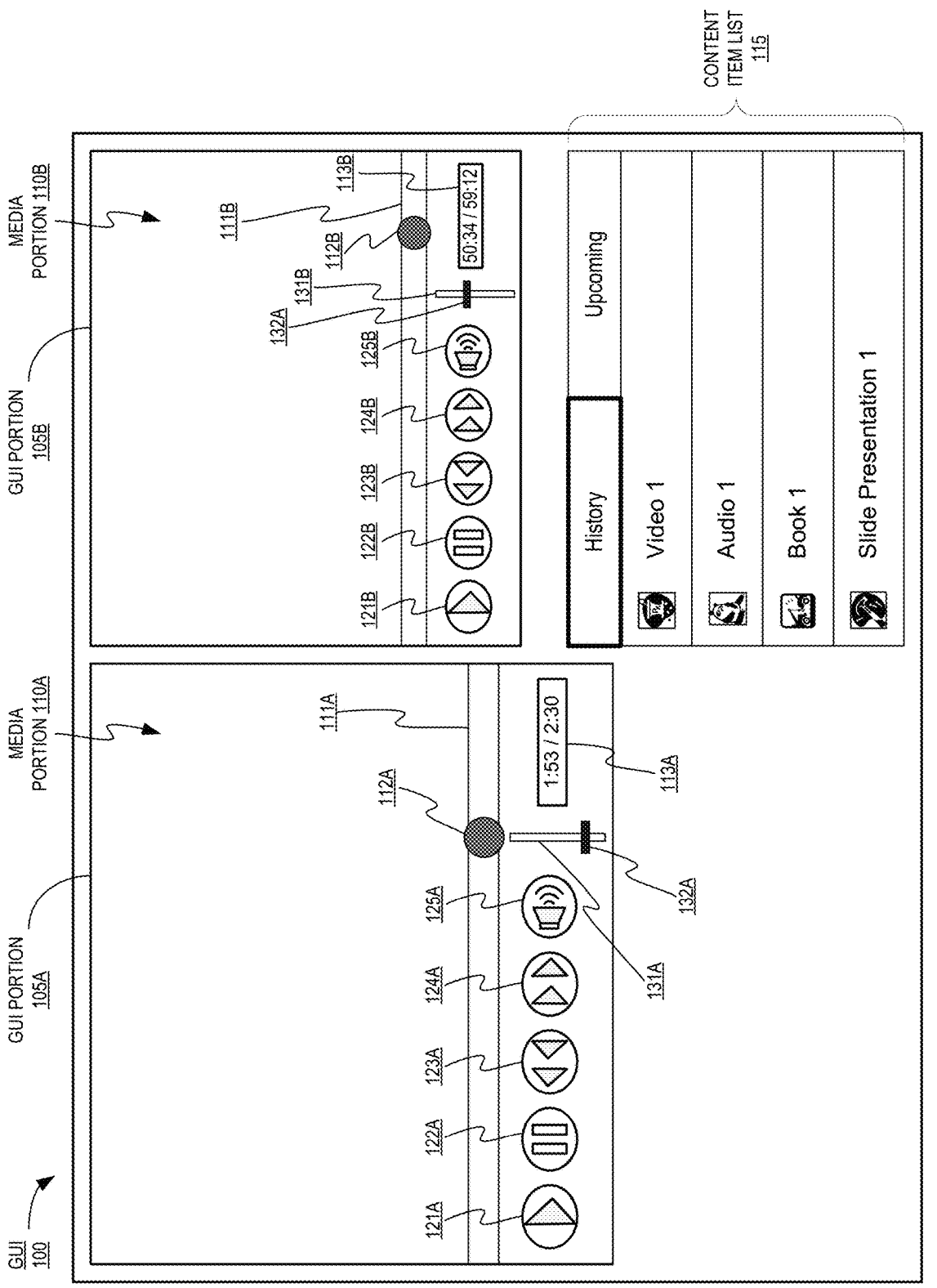
FIG. 1 is a diagram illustrating an example graphical user interface (GUI), in accordance with one embodiment of the present disclosure.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

A content sharing platform may allow a first user to create and/or provide a first content item that may refer to one or more additional content items. For example, the first user may provide a video of the first user lecturing on a particular topic. During the lecture, the first user may refer to one or more additional content items. For example, during the lecture, the first user may refer to other videos that illustrate certain concepts discussed by the first user in the lecture. The content sharing platform may also allow the first user to perform one or more actions (e.g., starting playback, pausing playback, fast forwarding, rewinding, etc.) with respect to the one or more additional content items and may store and/or record the actions, the times or portions of the first content item at which the first user performed the actions, and the portions of the one or more additional content items that are associated with the actions. The first user may wish to allow other users, such as a second user, to view the content item and to view the one or more additional content items that the first user referred to during the lecture. The first user may also wish to allow other uses to view or experience the actions the first user performed with respect to the one or more additional content items. For example, the first user may wish to allow the second user to experience or view the same portions of the additional content items accessed by the first user and to view when the user paused, fast-forwarded, and/or rewound the additional content items. The content sharing platform may record the additional content items accessed by the first user and the actions performed by the first user with respect to the one or more additional content items. When a second user consumes (e.g., views, plays, etc.) the first content item, the second user receives data indicative of the one or more additional content items and the actions performed with respect to the one or more additional content items. The content sharing platform provides the one or more additional content items and performs the actions (that were performed by the first user) with respect to the one or more additional content items. The content sharing platform may also perform the actions at the same times and/or with respect to the same portions within the first content item as the actions performed by the first user.

The content sharing platform may simultaneously present the first content item and the one or more additional content items to the user (as illustrated and discussed below in conjunction with FIG. 1). This may allow other users to view the first content item, the one or more additional content items, and/or the actions of the first user with respect to one or more additional content items. For example, the second user may view the first content item (e.g., a video of a lecture) and the additional content items (e.g., other videos that demonstrate concepts discussed in the lecture). The actions performed by the first user with respect to the one or more additional content items may be performed as the second user views the first content item and the one or more additional content items. For example, as the second user is viewing the first content item (e.g., the lecture), the first content item may refer to a second content item that demonstrates a concept from the lecture. The first user may pause the second content item at a certain point in the second content item to emphasize the concept. When the second user views the first content item and the second content item, the second content item may be paused at the same point that the first user paused the second content item. This allows the first user to provide more interesting, enriching and/or engaging content while still allowing the second user to view the content item in conjunction with the one or more additional content items. For example, the second user does not have to stop viewing the first content item in order to view the second content item because both the first content item and the second content item are presented to the user simultaneously or in parallel. In addition, presenting both the first content item and the second content item (from the one or more additional content items) simultaneously allows the second user to gain better context and/or understanding of how and when the first content item referred to the second content item. In addition, presenting both the first content item and the second content item may allow the content sharing platform to better track and/or determine the amount of revenue generated by the first content item. For example, if the first content item refers to a second content item and the user stops viewing the first content item in order to view the second content item, the revenue generated by advertisements may be credited to the owner of the second content item even though the second content item was viewed because the user initially viewed the first content item. Presenting both the first and second content items simultaneously allows the owner or curator of the first content item to be credited with the revenue generated by advertisements because the content sharing platform may be able to determine that the user is viewing the first content item and that the one or more additional content items were not separately accessed by the user, but rather, accessed when presenting the first content item to the second user.

FIG. 1 is a diagram illustrating an example graphical user interface (GUI) 100 in accordance with one embodiment of the present disclosure. In one embodiment, the GUI 100 may be part of a media viewer (e.g., media viewer 311 as discussed below in conjunction with FIG. 3) provided by a server (e.g., server 330 discussed below in conjunction with FIG. 3). For example, the GUI 100 may be part of a media viewer that is embedded in a web page (e.g., an embedded media viewer such as a Flash® player or a hypertext markup language-5 (HTML5)-based player) and the GUI 100 may be rendered by a web browser executing on a client device. In another embodiment, the GUI 100 may be part of a media viewer that may be separate from a web page/web browser (e.g., may be a standalone media viewer and/or application). For example, the media viewer may be a separate application (e.g., an app) that is executing on the client device. The GUI 100 includes GUI portion 105A, GUI portion 105B, and content item list 115.

The GUI portion 105A includes media viewer controls which may be used to control the consumption of the content items (e.g., digital videos and/or digital music). The media viewer controls include a play button 121A, a pause button 122A, a rewind button 123A, a fast forward button 124A, and a volume button 125A. The play button 121A may allow a user to begin and/or restart playback of the content items. The pause button may allow a user to pause and/or un-pause playback of the content items. The rewind button 123A may allow a user to rewind playback, move and/or skip to an earlier point in time in the content items. The fast forward button 124A may allow a user to fast forward playback, move, and/or skip to a later point in time in the content items. The GUI portion 105A also includes a play time display 113A, a playback bar 111A and a playback slider 112A. The play time display 113A may display a current play time and/or a total play time for the content items. For example, a total play time (e.g., the total length) of content item may be 2 minutes and 30 seconds (e.g., 2:30). The current play time may be current time/position in the playback of content item (e.g., 1 minute and 53 seconds or 1:53). Playback slider 112A is positioned on a region of a playback bar 111A that corresponds to the current play time (e.g., 1:53). The playback slider 112A may be adjusted (e.g., dragged) to any other region of the playback bar 111A to adjust the current play time shown in the play time display 113A. The GUI 100 includes a media portion 110A that may display a content item. For example, media portion 110A may be the portion of the GUI 100 where a video (e.g., a content item) is played. The media portion 110A may also play other types of videos, images, music, and/or other content items.

The volume button 125A may allow a user to control the volume of sounds, music, and/or other audible noises in the videos. In one embodiment, the volume bar 131A and the volume slider 132A may be displayed when the user clicks and/or activates the volume button 125A. For example, the volume bar 131A and the volume slider 132A may not be initially displayed in the GUI portion 105. After the user clicks the volume button 125A, the volume bar 131A and the volume slider 132A may be displayed. The user may move and/or slide the volume slider 132A up and/or down along the volume bar 131A to control the volume of sounds, music, and/or other audible noises in the videos. For example, the user may slide the volume slider 132A up to increase the volume or may slide volume slider 132A down to decrease the volume. In one embodiment (not shown in the figures), the GUI portion 105A may also include buttons (e.g., magnifying glass buttons) that allow a user to zoom in and/or zoom out during the consumption of content items. This may allow a user to get a closer view and/or a farther view of the content item.

The GUI portion 105B also includes media viewer controls (similar to GUI portion 105A) which may be used to control the consumption of the content items (e.g., digital videos and/or digital music). The GUI portion 105B also includes a play time display 113B, a playback bar 111B and a playback slider 112B. The play time display 113B may display a current play time (e.g., e.g., 50 minutes and 34 seconds or 50:34) and/or a total play time (e.g., 59 minutes and 12 seconds or 59:12) for the content items. The current play time may be current time/position in the playback of content item. Playback slider 112B is positioned on a region of a playback bar 111B that corresponds to the current play time (e.g., 1:53). The playback slider 112B may be adjusted (e.g., dragged) to any other region of the playback bar 111B to adjust the current play time shown in the play time display 113B. The GUI portion 105B includes a media portion 110B that may display a content item (e.g., a video, an image, a digital book, digital music and/or other content items. For example, media portion 110B may be the portion of the GUI 100 where a video (e.g., a content item) is played. The media portion 110B may also play other types of videos, images, music, and/or other content items.

The volume button 125B may allow user to control the volume of sounds, music, and/or other audible noises in the videos. In one embodiment, the volume bar 131B and the volume slider 132B may be displayed when the user clicks and/or activates the volume button 125B. The user may move and/or slide the volume slider 132B up and/or down along the volume bar 131B to control the volume of sounds, music, and/or other audible noises in the videos. In one embodiment (not shown in the figures), the GUI portion 105B may also include buttons (e.g., magnifying glass buttons) that allow a user to zoom in and/or zoom out during the consumption of content items. This may allow a user to get a closer view and/or a farther view of the content item.

As discussed below in conjunction with FIG. 3, a first user may perform operations to create a content item and/or may provide a content item to a content sharing platform. For example, a first user may record a first content item, such as a digital video, and provide the first content item to the content sharing platform. The digital video may refer to additional content items (e.g., an additional digital video, an additional digital book, additional digital audio, an additional slide presentation, an additional document, etc.). The first user (that performed operations to create (e.g., recorded) and/or provided the first content item to the content sharing platform) may also perform actions with respect to the one or more additional content items as the first content item is created. For example, the first user may begin consumption (e.g., playback) of a first additional digital video (e.g., an additional content item) at a first point (e.g., at a first time, such as 1 minutes and 3 seconds) in the first additional digital video and may stop consumption (e.g., stop or pause playback) at a second point (e.g., at a second time, such as 2 minutes and 13 seconds). The first user may also begin consumption (e.g., playback) of a second additional digital video (e.g., an additional content item) at a first point in the second additional digital video and may stop consumption at a second point while the first content item is being consumed (e.g., the first content item and the second additional digital video may be played or consumed simultaneously or in parallel). In other embodiments, a first user may perform any number of actions with respect to any number of content items. In one embodiment, an action may be any activity, function, act, and/or operation that affects the consumption of a content item. Examples of the actions performed by the first user may include, but are not limited to, starting consumption of a content item, stopping consumption (e.g., pausing or stopping playback) of a content item, fast forwarding a content item, rewinding a content item, resuming consumption of a content item, zooming into a part of a content item, changing the volume of the audio for a content item, highlighting or indicating a portion of a content item, etc.

In one embodiment, the first user may perform these actions when the first user performs actions to create the first content item. For example, as the first user records a digital video, the first user may perform one or more actions (e.g., may start consumption of an additional content item, may pause consumption of an additional content item, etc.). The actions may be performed at certain portions (e.g., a certain times, positions, and/or points) in the first content item. In another embodiment, the first user may perform these actions after the first content item is created and/or provided to the content sharing platform. For example, the first user may record the first content item and provide the first content item to the content sharing platform. The first user may provide user input (e.g., via a GUI not shown in the figures) indicating actions with respect to additional content items (e.g., pausing a first additional content item, fast forwarding a second additional content item, rewinding a third additional content item, etc.). The user input may also indicate portions (e.g., times or points) in the first content item when the actions should be performed or should occur. Each action may be associated with one of the one or more additional content items. In another embodiment, the content sharing platform may record or store the actions performed by the first user with respect to the one or more additional content items. The content sharing platform may also record or store the portions (e.g., times or points) at when the actions were performed by the first user and/or the portions when the actions should be performed or should occur.

The GUI 100 may present content items (e.g., may display content items) and allow users to consume (e.g., view, watch, listen, read, etc.) content items. The content items may be included in a content sharing platform (as discussed below in conjunction with FIG. 3). In one embodiment, the first content item that is created and/or provided by the first user may be presented in the media portion 110B of the GUI portion 105B to a second user (and/or to other users). For example, a digital video may be presented in the media portion 110B. In another example, digital auto may be presented in the media portion 110B. As discussed above, the first content item may refer to one or more additional content items (e.g., a set of content items) and/or the content sharing platform may receive actions from the first user with respect to the one or more additional content items. The one or more additional content items may be included in the content item list 115. The content item list 115 may include data indicative of the one or more additional content items referred to by the first content item. For example, the content item list 115 includes the titles of four content items, Video 1, Audio 1, Book 1, and Slide Presentation 1. The content item list 115 may also include additional information for the one or more additional content items. For example, the content item list 115 may include descriptions for the content items, statistical information (e.g., total number of views, total number of approvals or "likes," the author or owner, etc.).

As discussed above, the first user may perform actions with respect to the one or more additional content items that are referred to by the first content item. The first user may perform these actions at certain portions (e.g., certain times or points) of the first content item. For example, at one minute into the first content item (e.g., at the time 0:01:00), the first user may begin consumption (e.g., begin playback) of a second content item and at three minutes into the first content item, the first user may stop consumption (e.g., stop playback) of the second content item. As the first content item is presented to the second user in the media portion 110B, the additional content items referenced by the first content item may be presented to the second user in the media portion 110A. For example, when the second user reaches the time of one minute during the playback of the first content item, the second content item may be presented in the media portion 110A and when the second users reaches the time of three minutes during the playback of the first content item, the playback of the second item may stop in the media portion 110A.

By allowing a first user to provide a first content item that refers to additional content items and to perform actions with respect to the additional content items at certain portions (e.g., times, points, or positions) in the additional content items, the content sharing platform allows other users to consume more useful, interesting, enriching and/or engaging content. For example, the first content item may be a video covering a sporting event. The first content item may cover particular highlights that occurred during the sporting event (e.g., the scoring of a goal, a fumble, a penalty, etc.). The first user may perform actions with respect to additional content items that may be videos of the particular highlights (e.g., a video of a goal, a fumble, a penalty, etc.). For example, as the first user discusses a touchdown made by a player in the game, the first user may play an additional content item that depicts the touchdown made by the player in the game and may pause the additional content item at a certain point (e.g., to illustrated how the touchdown was made by the player). As the particular highlights are covered in the first video that is presented in the media portion 110B, an additional video (that may show a particular highlight) may be presented in the media portion 110A. For example, at the portion of the first content item that refers to a particular highlight in the sporting event, the media portion 110A may present a content item that shows the particular highlight. This allows a second user to view both content items (e.g., both videos) simultaneously in the GUI 100. This may also allow the second user to view additional relevant or interesting content more easily and/or more quickly. For example, the user may not need to use a second, separate GUI to view the second content item. This may also allow the second user to better understand the context of the second content item in view of the first content item (e.g., to better understand how the first content item referred to the second content item).

The content item list 115 includes a "History" tab and an "Upcoming" tab. As illustrated in FIG. 1, the "History" tab is selected. Also as illustrated in FIG. 1, the play time of the first content item presented in media portion 110B is 50:34. Because the "History" tab is selected, the content item list 115 includes content items that are referenced by the first content item at or before the play time of 50:34. In another embodiment, the second user may select the "Upcoming" tab. When the second user selects the "Upcoming" tab, the content item list 115 may be modified and/or updated to indicate one or more content items that are may be referenced by the first content at or after the playtime of 50:34.

In one embodiment, the second user may pause the consumption (e.g., playback) of the first content item (presented in the first GUI portion 105B) using button 122B. The second user may also view the second content item using the GUI portion 105A. For example, the second user may fast forward or rewind to a different portion of the second content item, independent of the first content item. The second user may also un-pause consumption of the first content item. In one embodiment, the first content item may be a live content item (e.g., a content item that is broadcasted, transmitted, and/or provided to users while the content item is being created and/or recorded). When the first content item is a live content item, the GUI portion 105B may resume consumption of the first content item at the time that the first content item was paused or at a latest time of the first content item. For example, the first content item may be recorded as other users view the content item (e.g., may be live). The second user may pause the first content item at a first time X1. The first content item continues to record and the content sharing platform continues to provide the first content item to other users. When the second user pauses the first content item, the first content item may be at time X2 in the recording of the first content item (e.g., a latest time). The GUI portion 105B may resume playback of the first content item at either time X1 or at time X2. In one embodiment, the content sharing platform may prompt the user for input as to whether the user wishes to resume playback at the time the user paused playback of the first content or at the latest time of the content item. In another embodiment, the content sharing platform may automatically determine whether to resume playback at the time the user paused playback of the first content or at the latest time of the content item. For example, the content sharing platform may use a default preference or may use a user preference (provided by a user) to determine whether to resume playback at the time the user paused playback of the first content or at the latest time of the content item.

Although content items referenced before and after the current playtime of 50:34 are presented using tabs (as illustrated in FIG. 1), other embodiments may present all of the additional content items in a content item list simultaneously and may use various visual indicators (e.g., icons, colors such as greying out content items, text, images, a dividing line to separate content items referenced before or after the current playtime, etc.). In additional embodiments, the GUI portion 105A, GUI portion 105B, and the content item list may be arranged in various positions and/or sizes in the GUI 100. For example, the positions of the GUI portion 105A and GUI portion 105B may be swapped. In another example, the content item list 115 may be positioned under the media portion 110A.

In one embodiment, content sharing platform may pause consumption (e.g., playback) of the first content item when the user accesses different portions of the second content item. For example, if the user fast forwards, rewinds, or seeks/jumps to a particular portion of the second media (e.g., seeks using the playback slider 112A), the content sharing may pause consumption of the first content item (e.g., may pause the playback or may stop providing the first content item to the user). In another embodiment, the content sharing platform may pause consumption of the first media when the second user accesses a portion of the second content item that is not referenced by the first content item. For example, the first content item may refer to the first minute of a second content item. When the second user accesses the second minute of the second content item, the content sharing may pause consumption of the first content item.

In another embodiment, the user may select one of the content items in the content item list 115. For example, the user may select the content item Audio 1. The content sharing platform may provide the portion of the first content item that refers to the content item Audio 1. For example, if the portion of the first content item starting at one minute (e.g., 00:01:00) refers to the content item Audio 1, the content sharing platform may provide the content item Audio 1 starting at the one minute portion of the first content item.

Figure 2:
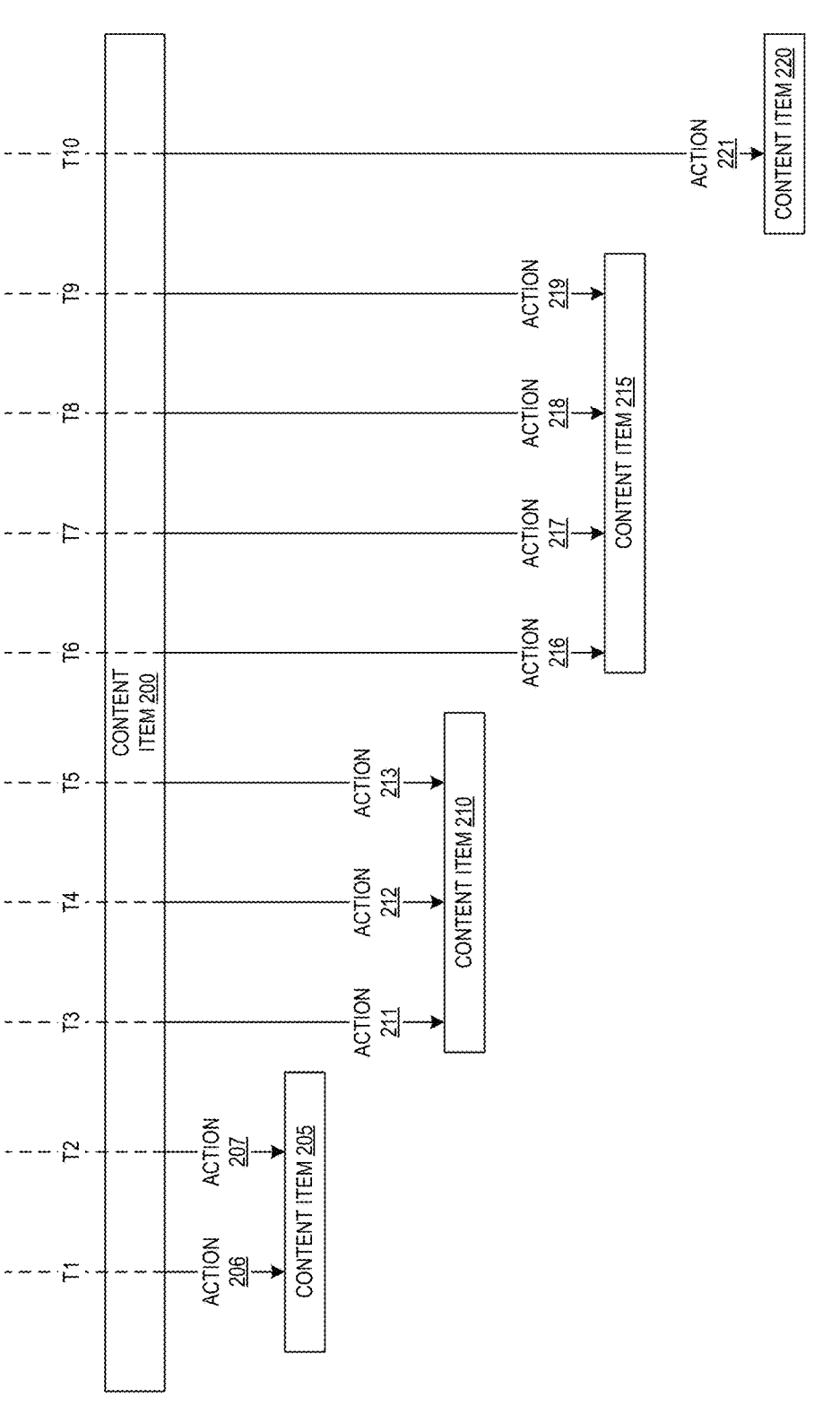
FIG. 2 is a diagram illustrating exemplary content items, in accordance with one embodiment of the present disclosure.

FIG. 2 is a diagram illustrating exemplary content items 200, 205, 210, 215, and 220, in accordance with one embodiment of the present disclosure. As discussed above in conjunction with FIG. 1, a content sharing platform and/or a media viewer may present a GUI with a first GUI portion and a second GUI portion. The second GUI portion may present a content item that is created (e.g., recorded) and/or provided by a first user of the content sharing platform. For example, the second GUI portion may present a live video created by the first user. In another example, the second GUI portion may present a video that is provided (e.g., uploaded) by the first user to the content sharing platform. Also as discussed above, the first content item may refer to one or more additional content items (e.g., a set of content items) such as content items 205, 210, 215, and 220. For example, the content (e.g., the subject matter) of the first content item may refer to content items 205, 210, 215, and 220. Actions 206 and 207 are performed with respect to content item 205 at times (e.g., portions, points, etc.) T1 and T2 of the content item 200, respectively. Actions 211, 212, and 213 are performed with respect to content item 210 at times, T3, T4, and T5 of the content item 200, respectively. Actions 216, 217, 218, and 219 are performed with respect to content item 215 at times T6, T7, T8, and T9 of the content item 200, respectively. Action 221 is performed with respect to content item 220 at time T10 of the content item 200.

The actions 206, 207, 211, 212, 213, 216, 217, 218, 219, and 221 may be performed by the user that creates (e.g., records) and/or provides the first content item to the content sharing platform. Examples of the actions 206, 207, 211, 212, 213, 216, 217, 218, 219, and 221 performed by the first user may include, but are not limited to, starting consumption of a content item, stopping consumption (e.g., pausing or stopping playback) of a content item, fast forwarding a content item, rewinding a content item, resuming consumption of a content item, etc. The content sharing platform may store and/or record the actions 206, 207, 211, 212, 213, 216, 217, 218, 219, and 221. The content sharing platform may also store and/or record the times T1 through T10 for each of the actions 206, 207, 211, 212, 213, 216, 217, 218, 219, and 221. The content sharing platform may also store and/or record the portions of the content items 205, 210, 215, and 220 for the actions 206, 207, 211, 212, 213, 216, 217, 218, 219, and/or 221. For example, the action 206 may indicate that at time T1 of the content item 200, the user started playback of the content item 205 at the portion starting at the two minute point of the content item 205. The action 207 may indicate that at time T2 of the content item 200, the user stopped playback of the content item 205 at the portion starting at the three minute point of the content item 205. The content sharing platform may store the actions (e.g., start and stop playback), the times of the content item 200 when the actions were performed (e.g., T1 and T2), and the portions of the content item 205 that were associated with the actions 206 and 207 (e.g., the one minute point and three minute point of content item 205).

In other embodiments, multiple actions may be combined into and/or represented as one action. For example, rather than having a first action that starts playback of content item 205 and a second action that stops playback of the content item 205, the content sharing platform may use one action to indicate that the content item 205 was played for a certain period of time starting from a portion of the content item 205. For example, the content sharing platform may use one action to indicate that the content item 205 was played for two minutes starting at the one minute point of the content item 205. In another embodiment, the content sharing platform may also store and/or record identifiers (e.g., a uniform resource locator, an alphanumeric identifier, a numeric identifier, etc.) for the content items 205, 210, 215, and 220 when the user performs the actions 206, 207, 211, 212, 213, 216, 217, 218, 219, and 221.

As illustrated in FIG. 1, the first portion of the GUI may present the content items 205, 210, 215, and 220 to a second user. As the second user consumes the content item 200 (e.g., as the second user listens to, plays, reads, etc., the content item 200). The content sharing platform may determine the current play time (or a current portion) of the content item. Based on the current play time, the content sharing platform may identify one of the content items 205, 210, 215, or 220 and may perform one of the actions 206, 207, 211, 212, 213, 216, 217, 218, 219, and 221. For example, the current play time of the content item 200 reaches time T1, the content sharing platform may provide the content item 205 to the second user and may provide data indicative of the action 206 to the user (e.g., may provide action data indicating that the content item 205 should be played starting at a certain portion of the content item 205). In another example, the current play time of the content item 200 reaches time T8, the content sharing platform may provide the content item 215 to the second user and may provide data indicative of the action 218 to the user (e.g., may provide action data indicating that playback of the content item 215 should be paused at a certain portion of the content item 205).

In one embodiment, the content sharing platform may store data indicative of the actions 206, 207, 211, 212, 213, 216, 217, 218, 219, and 221, the times T1 through T10, and the portions of the content items 205 through 220 associated with the actions 206, 207, 211, 212, 213, 216, 217, 218, 219, and 221, as action data (as discussed below). When a second user consumes the content item 200, the content sharing platform may provide the action data to a media viewer (as discussed below). The media viewer may generate a content item list (as illustrated in FIG. 1) based on the action data. The media viewer may also use the action data to determine which actions to perform on which of the content items 205, 210, 215, and 220 (e.g., a set of additional content items that are referred to by the content item 200) when the user accesses different portions of the content item 200.

Figure 3:
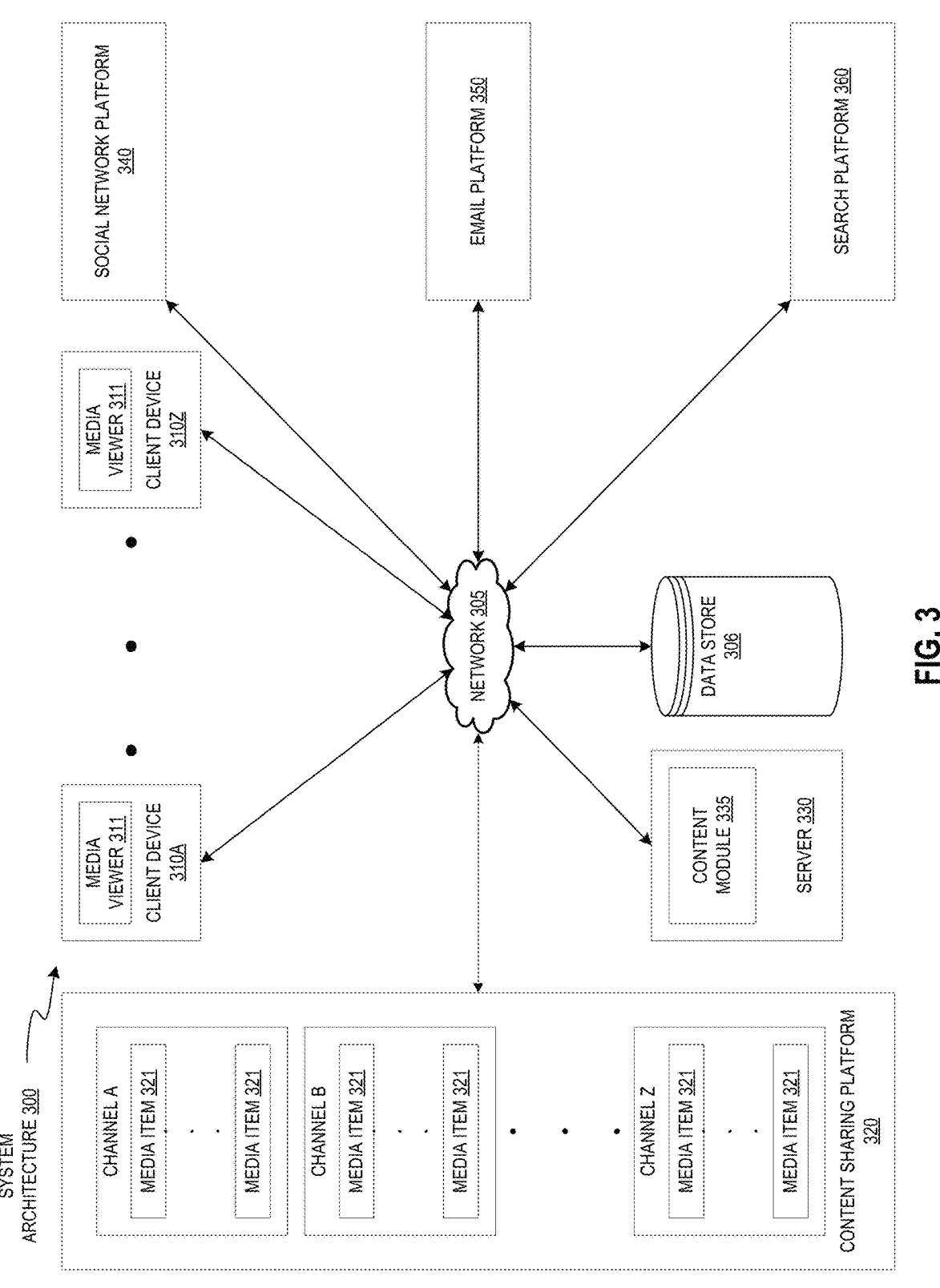
FIG. 3 is a diagram illustrating an example system architecture, in accordance with one embodiment of the present disclosure.

FIG. 3 illustrates an example system architecture 300, in accordance with one embodiment of the present disclosure. The system architecture 300 includes client devices 310A through 310Z, a network 305, a data store 306, a content sharing platform 320, a server 330, a social network platform 340, an email platform 350, and a search platform 360. In one embodiment, network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 310 may be may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers).

The client devices 310A through 310Z may each include computing devices such as personal computers (PCs), laptops, mobile phones, smart phones, tablet computers, netbook computers etc. Each client device includes a media viewer 311. In one embodiment, the media viewers 311 may be applications that allow users to view content, such as images, videos, web pages, documents, social shares, etc. For example, the media viewer 311 may be a web browser that can access, retrieve, present, and/or navigate content (e.g., web pages such as Hyper Text Markup Language (HTML) pages, digital content items, etc.) served by a web server. The media viewer 311 may render, display, and/or present the content (e.g., a web page, a media viewer) to a user. The media viewer 311 may also display an embedded media player (e.g., a Flash® player or an HTML5 player) that is embedded in a web page (e.g., a web page that may provide information about a product sold by an online merchant). In another example, the media viewers 311 may be a standalone application that allows users to view digital content items (e.g., digital videos, digital images, electronic books, etc.) and/or social shares. The media viewers 311 may be provided to the client devices 310A through 310Z by the server 330, the social network platform 340, and/or content sharing platform 320. For example, the media viewers 311 may be embedded media players that are embedded in web pages provided by the content sharing platform 320. In another example, the media viewers 311 may be applications that are downloaded from the server 330. In one embodiment, the media viewers 311 may present a GUI with different GUI portions (as illustrated in FIG. 1). The different GUI portions may present different content items (as illustrated and discussed above in conjunction with FIGS. 1 and 2).

In one embodiment, the content sharing platform 320 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to content items and/or provide the content items to the user. For example, the content sharing platform 320 may allow a user to consume, upload, search for, approve of (e.g., "like"), dislike, and/or comment on content items. The content sharing platform 320 may also include a website (e.g., a web page) that may be used to provide a user with access to the content items. The content sharing platform 320 includes multiple channels (e.g., channels A through Z). Each channel may include one or more content items 321. Examples of a content item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A content item may be consumed via the Internet and/or via a mobile device application. For brevity and simplicity, an online video (also hereinafter referred to as a video) is used as an example of a content item throughout this document. As used herein, "media," "media item," "online content item," "digital media," "digital content item," "content," and "content item" may include an electronic file that can be executed or loaded using software, firmware or hardware configured to present digital content (e.g., video, images, audio, text, etc.)

to an entity. In one embodiment, the content sharing platform 320 may store the content items using the data store 306.

Social network platform 340 may be one or more computing devices (e.g., servers), data stores, networks, software components, and/or hardware components that may be used to allow users to connect to, share information, and/or interact with each other. A social network platform 340 may present to a user a listing (e.g., activity feed, feed, stream, wall, etc.) of social shares (such as posts, comments, content items such as videos, images, audio, etc., status updates, favorability indications, tags, messages, etc.) generated by other users of the social network platform 340. The social network platform 340 may also include a content sharing aspect that allow users to upload, view, tag, and share content items, such as text content, video content, image content, audio content, and so on. Other users of the social network platform 340 may comment on the social shares, discover new social shares and/or content items, locate updates, and otherwise interact with the provided content. In one embodiment, the content sharing platform 320 may be integrated with the social network platform 340. For example, the social network platform 340 may use the content sharing platform 320 to allow users to upload and/or share content. In another embodiment, the social network platform 340 may be separate from the content sharing platform 320. In one embodiment, the social network platform 340 may also include chat functionality (e.g., a chat platform) to allow users to chat (e.g., to instant message) each other.

In one embodiment, email platform 350 may be one or more computing devices (e.g., servers), data stores, networks, software components, and/or hardware components that may be used to allow users to send and/or receive electronic-mail (emails) to each other. For example, a first user may use the email platform 350 to send an email to a second user regarding the time and location of a particular event. The first user may also attach files (e.g., video files, image files, text files, etc.) to the email. In one embodiment, the email platform 350 may also include chat functionality (e.g., a chat platform) to allow users to chat (e.g., to instant message) each other. In another embodiment, the search platform 360 may be one or more computing devices, data stores, networks, software components, and/or hardware components that may be used to allow users to search for information and/or data. For example, the search platform 360 may allow a user to search the Internet and/or other networks for articles, blogs, websites, web pages, images, videos, and/or other content related to a particular topic (e.g., how to fix a car). The search platform 360 may also include a search engine.

In one embodiment, the server 330 may be one or more computing devices (e.g., a rackmount server, a server computer, etc.). In one embodiment, the server 330 may be included in one or more of the content sharing platform 320, the social network platform 340, the email platform 350, and the search platform 360. For example, the server 330 may be part of the content sharing platform 320. In another example, the server 330 may be part of the social network platform 340. In another embodiment, the server 330 may be separate from the content sharing platform 320, the social network platform 340, the email platform 350, and the search platform 360 but may communicate (e.g., exchange data with) the content sharing platform 320, the social network platform 340, the email platform 350, and the search platform 360.

The server 330 includes a content module 335. The content module 335 may receive a first user's first content item that may refer to one or more additional content items. The content module 335 may also identify one or more actions performed by the first user with respect to one or more additional content items. The content module 335 may store and/or record the actions, the times or portions of the first content item in which the first user performed the actions, and the portions of the one or more additional content items that are associated with the actions. This may allow other users to view the first content item, the one or more additional content items, and/or the actions of the first user. This allows the first user to provide more interesting, enriching and/or engaging content while still allowing the user to view the content item in conjunction with the one or more additional content items.

The content module 335 may receive a first content item from a first user of the content sharing platform 320. For example, the content module 335 may allow the user to create (e.g., record) live content (e.g., record live video and broadcast/transmit the live video to other users of the content sharing platform 320). In another example, the content module 335 may allow the user to provide (e.g., to upload) a previously created first content item (e.g., a previously recorded video). The first content item (provided by the first user) may refer to additional content items (e.g., an additional digital video, an additional digital book, additional digital audio, an additional slide presentation, an additional document, etc.). The first user may also perform actions with respect to the one or more additional content items when providing or performing actions to create (e.g., record) the first content item (as discussed above in conjunction with FIGS. 1 and 2). In one embodiment, the first user may perform these actions when the first user creates the first content item. In another embodiment, the first user may perform these actions after the first content item is created and/or provided to the content sharing platform. The content module 335 may receive these actions from the first user (e.g., review user input from the first user) and may store action data indicative of the actions, the time or portion of the first content item in which the actions were performed, identifiers for the one or more additional content items, and portions of the one or more additional content items (as discussed above in conjunction with FIGS. 1 and 2).

In one embodiment, the content module 335 may also provide a GUI (e.g., GUI 100 illustrated in FIG. 1) that may be displayed by the media viewers 311. The GUI may include two portions. The second portion may present the first content item provided by the first user and the first portion may present the one or more content items that are referred to by the first content item. The content module 335 may analyze the actions performed by the first user to determine the one or more additional content items that are referred to by the first content item. The content module 335 may provide data indicative of a one or more additional content items to the media viewer 311 and a list of the one or more additional content items may be presented in a content item list (e.g., in content item list 115 illustrated in FIG. 1). The content module 335 may also provide additional information for the one or more additional content items (e.g., descriptions for the content items, statistical information, the author or owner, etc.).

In one embodiment, the content module 335 may determine a current play time of the first content item. For example, the content module 335 may determine that a user is using media view 311 to consume (e.g., play, listen to, read, etc.) the first content item and that the user is currently at a certain portion of a certain time in the first content item. The content module 335 may analyze the action data to identify a second content item from the one or more additional content items that corresponds to the current play time (as described above in conjunction with FIGS. 1 and 2). The content module 335 may provide the second content item to the media viewer 311 and may also perform one or more actions associated with the second content item (e.g., may play, pause, fast forward, and rewind, etc., the second content item, as discussed above in conjunction with FIGS. 1 and 2). When a user accesses a different portion of the first content item (e.g., when the user fast forwards the first content item or rewinds the first content item), the content module 335 may analyze the action data to identify a third content item from the one or more additional content items that corresponds to the new play time, may provide the third content item to the media viewer 311 and may also perform one or more actions associated with the third content item (as discussed above in conjunction with FIGS. 1 and 2).

The content module 335 may also receive user input indicating that the user wishes to pause the consumption (e.g., playback) of the first content item. The content module 335 may stop providing the first content item to the media viewer 311 and may continue to provide the second content item to the media viewer (as discussed above on conjunction with FIG. 1). The content module 335 may also receive user input indicating that the user wishes to un-pause consumption of the first content item. The content module 335 may allow the user to resume consumption of the first content item at the time that the first content item was paused or at a latest time of the first content item (if the content item is a live content item). In one embodiment, content module 335 may pause consumption (e.g., playback) of the first content item when the user accesses different portions of the second content item. In another embodiment, the content sharing platform may pause consumption of the first media when the second users access a portion of the second content item that is not referenced by the first content item. In another embodiment, the user may provide user input selecting one of the content items in the content item list (e.g., select content item Book 1 from content item list 115 illustrated in FIG. 1). The content module 335 may provide the portion of the first content item that refers to the content item selected from the content item list to the media viewer 311. The content module 335 may also provide the selected content item to the media viewer 311.

As discussed above, the media viewers 311 may be applications that allow users to consume (e.g., view, play, listen to, read, etc.) content, such as images, videos, text, digital books, audio, web pages, documents, social shares, etc. In one embodiment, the media viewer 311 may present a GUI with a first portion to present the first content item and a second portion to present one or more additional content items that are referred to by the first content item, such as the GUI 100 illustrated in FIG. 1.

In one embodiment, the media viewer 311 may receive action data (e.g., data indicative of actions performed by the first user with respect to one or more additional content items), identifiers for the one or more additional content items, starting portions/points for the one or more additional content items (e.g., the portions of the additional content items from which to start playback), and/or ending portions/ points for the one or more additional content items (e.g., the portions of the additional at which playback is to be stopped). The media viewer 311 may request portions of the first content item and the one or more additional content items from the content sharing platform based on the action data (as discussed above). The media viewer may also present a list (e.g., a content item list) of the one or more additional content items based on the action data (as discussed above).

Figure 4A:
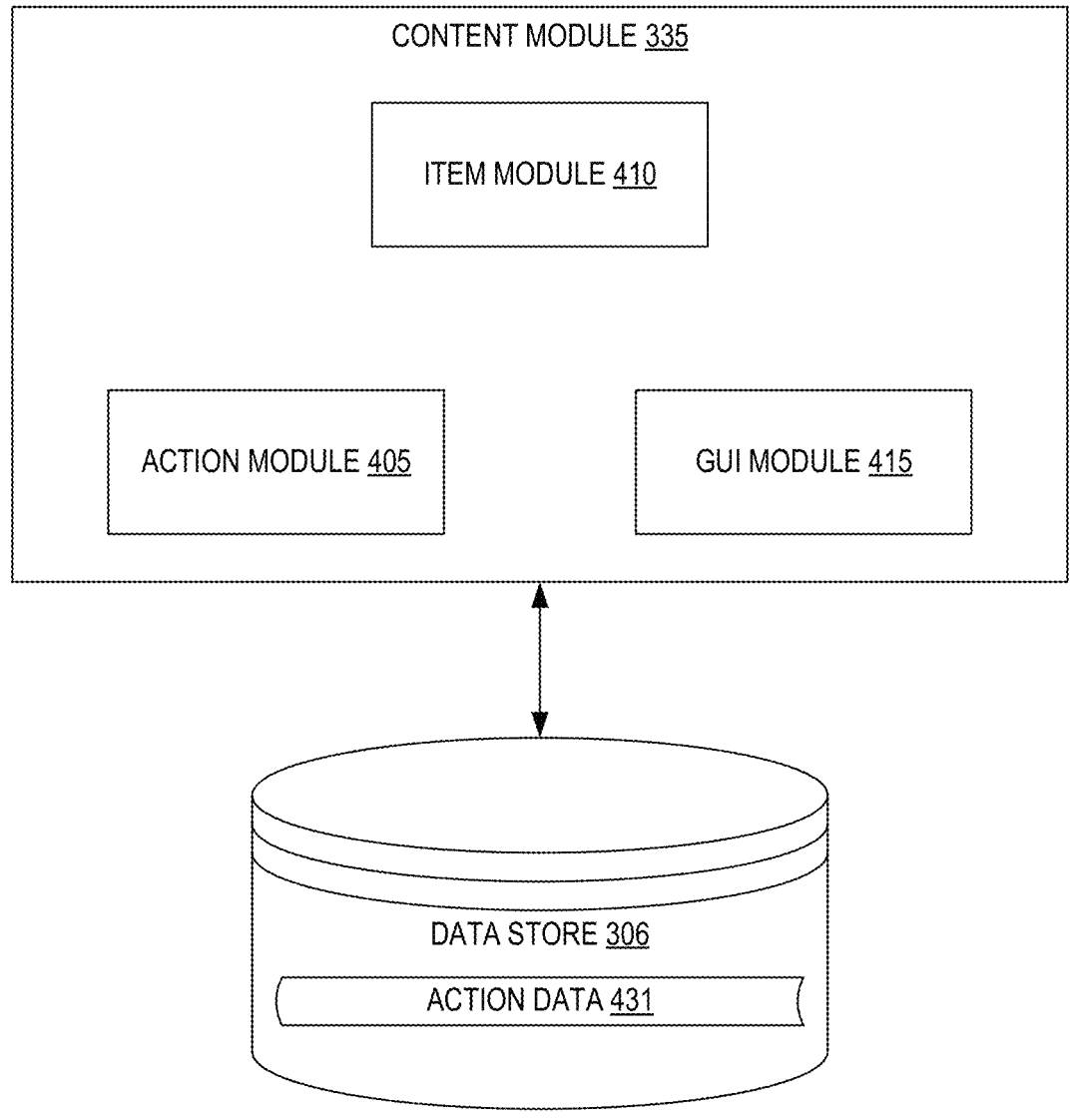
FIG. 4A is a block diagram illustrating a content module, in accordance with one embodiment of the present disclosure.

FIG. 4A is a block diagram illustrating a content module 335, in accordance with one embodiment of the present disclosure. The content module 335 includes an action module 405, an item module 410, and a GUI module 415. More or less components may be included in the content module 335 without loss of generality. For example, two of the modules may be combined into a single module, or one of the modules may be divided into two or more modules. In one embodiment, one or more of the modules may reside on different computing devices (e.g., different server computers). The content module 335, action module 405, the item module 410, and the GUI module 415 may each be processing logic that comprises hardware (e.g., circuitry, dedicated logic, programmable logic, microcode, etc.), software (e.g., instructions run on a processor to perform hardware simulation), or a combination thereof. The content module 335 may be part of a content sharing platform and/or a social network platform (as discussed above in conjunction with FIG. 3).

The content module 335 is communicatively coupled to the data store 306. For example, the content module 335 may be coupled to the data store 306 via a network (e.g., via network 305 as illustrated in FIG. 3). In another example, the data store 306 may be coupled directly to a server where the content module 335 resides (e.g., may be directly coupled to server 330). The data store 306 may be a memory (e.g., random access memory), a cache, a drive (e.g., a hard drive), a flash drive, a database system, or another type of component or device capable of storing data. The data store 306 may also include multiple storage components (e.g., multiple drives or multiple databases) that may also span multiple computing devices (e.g., multiple server computers). The data store 306 includes action data 431. The action data may be data indicative of one or more additional content items referred to by a first content item (e.g., identifiers for the one or more additional content items), actions performed with respect to the one or more additional content items (e.g., pausing a content item, fast forwarding a content item, etc.), and the times or portions of the first content item that that are associated with the actions performed by the first user. The action data 431 may also include data indicative of start times, start portions, starting points, end time, end portions and/or ending points for the one or more additional content items. For example, the first user may start playback of an additional content item at time 00:01:00 (e.g., one minute into the content item) and may stop playback of the additional content item at time 00:03:34 (e.g., three minutes and thirty-four seconds into the content item). The action data may include the start time (e.g., 00:01:00) and the end time (00:03:34) for the additional content item.

In one embodiment, the item module 410 may receive a first content item from a first user of the content sharing platform (as discussed above). The first content item (provided by the first user) may refer to additional content items (e.g., an additional digital video, an additional digital book, additional digital audio, an additional slide presentation, an additional document, etc.). The first user may also perform actions with respect to the one or more additional content items when providing or creating the first content item (as discussed above). The item module 410 may identify the one or more additional content items based on the actions received from the user.

In one embodiment, the action module 405 may receive the actions from the first user and may generate action data (e.g., data indicative of the actions performed by the user, the content items associated with the actions, start times, end times, etc.). The action module 405 may provide data indicative of one or more additional content items to a media viewer. The action module 405 may also provide additional information for the one or more additional content items (e.g., descriptions for the content items, statistical information, the author or owner, etc.).

In one embodiment, the action module 405 may determine a current play time of the first content item when the user consumes the first content item and/or accesses different portions of the first content item. The action module 405 may analyze the action data to identify a second content item from the one or more additional content items that corresponds to the current play time (as described above in conjunction with FIGS. 1 and 2). The action module 405 may provide the second content item to the media viewer and may also perform one or more actions associated with the second content item (e.g., as discussed above in conjunction with FIGS. 1 and 2). The action module 405 may also receive user input indicating that a user wishes to pause the consumption of the first content item and may stop providing the first content item to the media viewer 311 and may continue to provide the second content item to the media viewer (as discussed above on conjunction with FIG. 1). The action module 405 may also receive user input indicating that the user wishes to un-pause consumption of the first content item and may allow the user to resume consumption of the first content item at the time that the first content item was paused or at a latest time of the first content item (if the content item is a live content item). In one embodiment, action module 405 may pause consumption (e.g., playback) of the first content item when the user accesses different portions of the second content item. In another embodiment, the user may provide user input selecting one of the content items in the content item list (e.g., select content item Slide Presentation 1 from content item list 115 illustrated in FIG. 1). The action module 405 may provide the portion of the first content item that refers to the content item selected from the content item list to the media viewer. The action module 405 may also provide the selected content item to the media viewer.

In one embodiment, the GUI module 415 may also provide a GUI (e.g., GUI 100 illustrated in FIG. 1). The GUI may include two portions. The second portion may present the first content item provided by the first user and the first portion may present the one or more content items that are referred to by the first content item. The GUI may also include a list of one or more content items (as illustrated in FIG. 1).

Figure 4B:
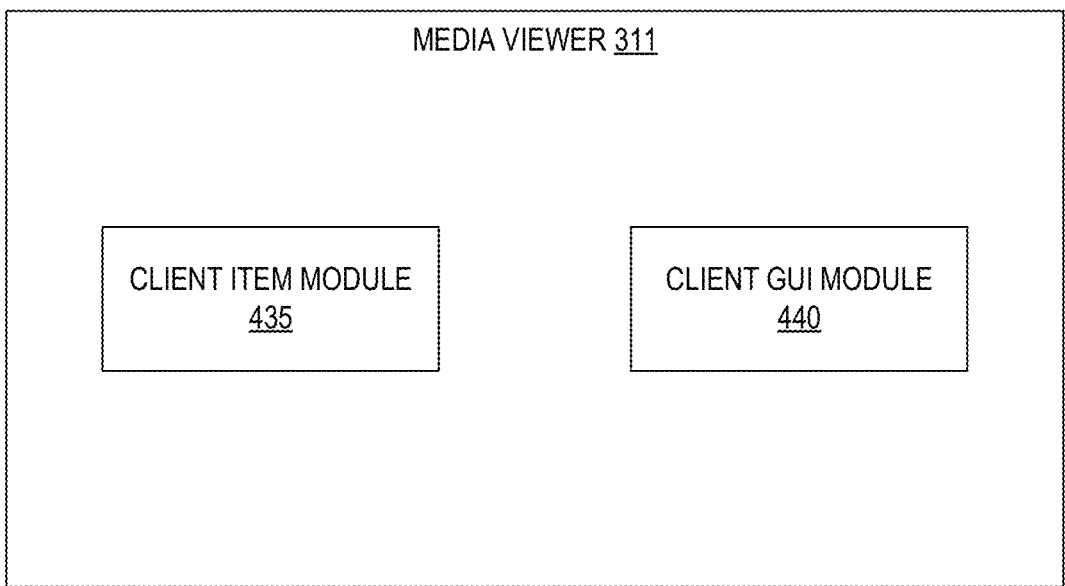
FIG. 4B is a block diagram illustrating a media viewer, in accordance with one embodiment of the present disclosure.

FIG. 4B is a block diagram illustrating a media viewer 311, in accordance with one embodiment of the present disclosure. The media viewer 311 includes a client item module 435 and a client GUI module 440. More or less components may be included in the media viewer 311 without loss of generality. For example, two of the modules may be combined into a single module, or one of the modules may be divided into two or more modules. In one embodiment, one or more of the modules may reside on different computing devices (e.g., different server computers). The media viewer 311, the client item module 435, and the client GUI module 440 may each be processing logic that comprises hardware (e.g., circuitry, dedicated logic, programmable logic, microcode, etc.), software (e.g., instructions run on a processor to perform hardware simulation), or a combination thereof.

In one embodiment, the client item module 435 may receive a first content item from a content sharing platform (as discussed above). As discussed above, the first content item (provided by the first user) may refer to additional content items (e.g., an additional digital video, an additional digital book, additional digital audio, an additional slide presentation, an additional document, etc.). The client item module 435 may identify the one or more additional content items based on the action data received from the content sharing platform. The action data may be data indicative of one or more additional content items referred to by a first content item (e.g., identifiers for the one or more additional content items), actions performed with respect to the one or more additional content items (e.g., pausing a content item, fast forwarding a content item, etc.), and the times or portions of the first content item at that are associated with the actions performed by the first user. The action data may also include data indicative of start times, start portions, starting points, end times, end portions and/or ending points for the one or more additional content items.

In one embodiment, the client item module 435 may determine a current play time of the first content item when the user consumes the first content item and/or accesses different portions of the first content item. The client item module 435 may provide the current play time of the first content item to the content sharing platform. The content sharing platform may provide the media viewer 311 with content items based on current play time (as described above in conjunction with FIGS. 1 through 3). The client item module 435 may also receive user input indicating that a user wishes to pause and/or un-pause the consumption of the first content item and may provide the user input to the content sharing platform. In one embodiment, the client item module 435 may provide a message or data indicating that consumption (e.g., playback) of the first content item should be paused when the user accesses different portions of the second content item. In one embodiment, the user may provide user input selecting one of the content items in the content item list (e.g., select content item Slide Presentation 1 from content item list 115 illustrated in FIG. 1). The client item module 435 may provide data indicative of the selected content item to the content sharing platform.

In one embodiment, the client GUI module 440 may also provide, present, and/or display a GUI (e.g., GUI 100 illustrated in FIG. 1). The GUI may include two portions. The second portion may present the first content item provided by the first user and the first portion may present the one or more content items that are referred to by the first content item. The GUI may also include a list of one or more content items (as illustrated in FIG. 1).

Figure 5:
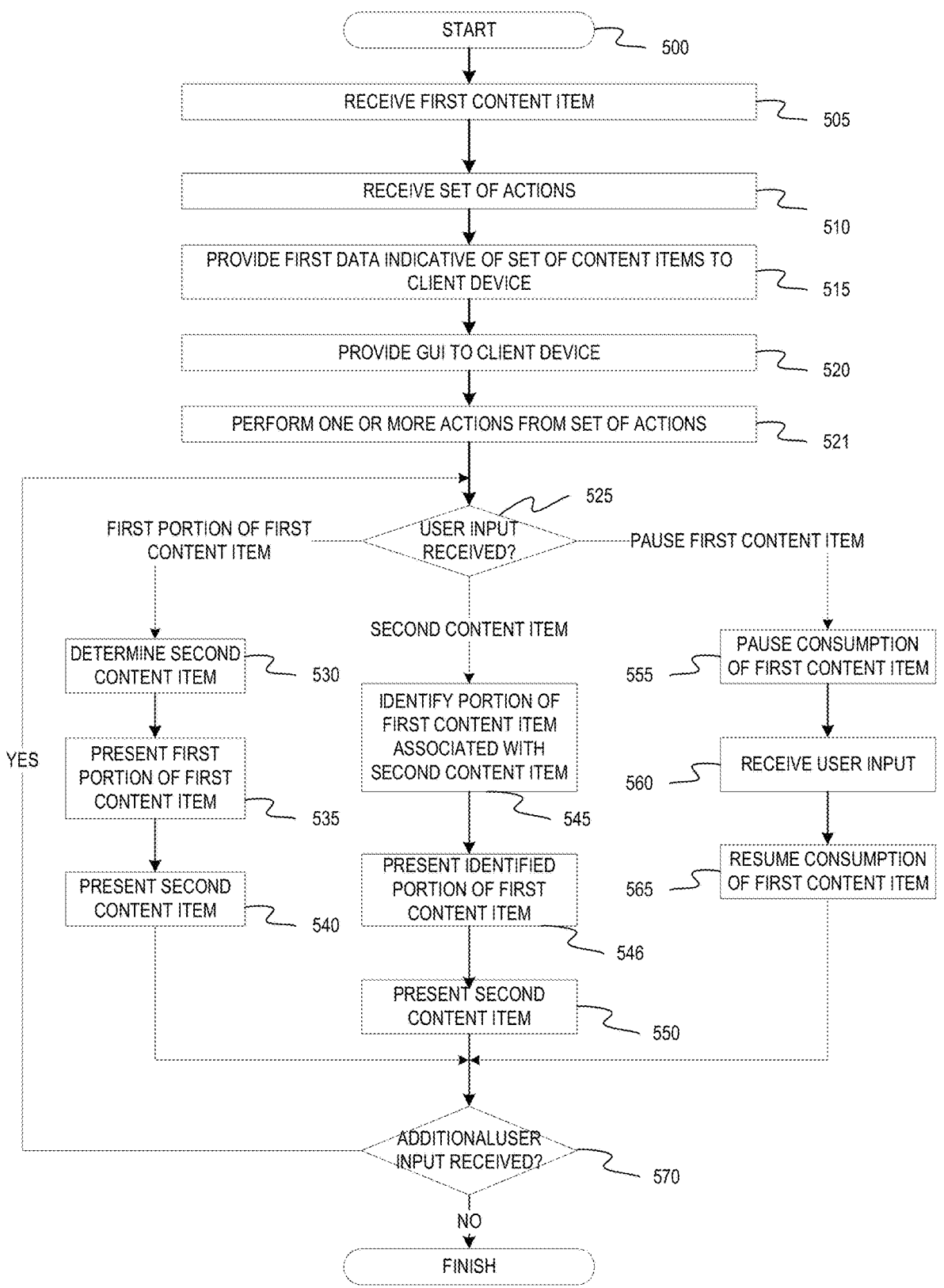
FIG. 5 is a flow diagram illustrating a method of presenting multiple content items, in accordance with one embodiment of the present disclosure.
Figure 6:
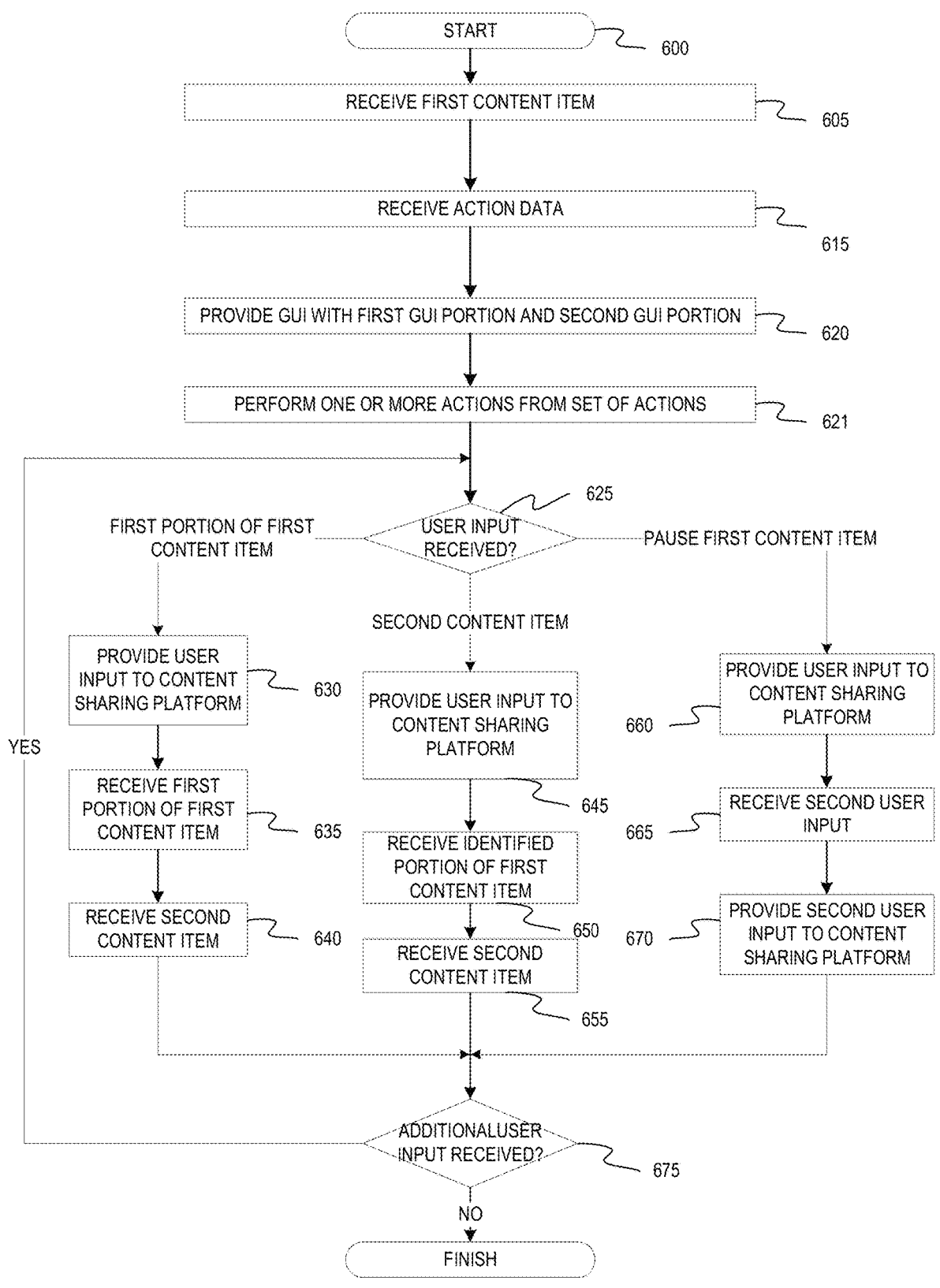
FIG. 6 is a flow diagram illustrating a method of presenting multiple content items, in accordance with another embodiment of the present disclosure.

FIGS. 5-6 are flow diagrams illustrating methods of presenting multiple content items. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of presenting multiple content items, in accordance with an embodiment of the present disclosure. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a content module, a content sharing platform, and/or a server, as illustrated in FIG. 3.

Referring to FIG. 5 the method 500 begins at block 505 where the processing logic receives a first content item from a first user (e.g., a first user may record a live content item or may upload a content item to a content sharing platform). At block 510, the processing logic receives a set of one or more actions from the first user. As discussed above, each of the one or more actions may be associated with one or more additional content items that the first content item may refer to. The processing logic provides data (e.g., action data) indicative of the set of content items to a client device (e.g., to a media view on a client device) at block 515. The processing logic also provides a GUI to the client device (block 520). As discussed above, the GUI may include a first GUI portion to present and/or display the first content item and a second GUI portion to display content items from the set of content items. The processing logic may perform one or more actions from the set of actions at block 521. For example, the processing logic may pause playback of an additional content item from the set of content items. In another example, the processing logic may fast forward an additional content item from the set of content items.

At block 525, user input is received from a second user of the client device. The processing logic analyzes the user input and determines whether the user input indicates a first portion of the first content item. If the user input indicates the first portion of the first content item, the processing logic proceeds to block 530, where the processing logic determines a second content item that is associated with the first portion of the first content item. At block 535, the processing logic presents the first portion of the first content item in the first GUI portion (as discussed above) and at block 540 the processing logic presents the second content item in the second GUI portion (as discussed above). After block 540, the method 500 proceeds to block 570 where the processing logic determines whether additional user input is received. For example, additional user input indicating another portion of the content item or indicating another content item may be received from the second user of the client device. If additional user input is received, the method 500 proceeds back to block 525. If no additional user input is received, the method 500 ends.

Referring back to block 525, if the processing logic determines that the user input indicates a second content item from the set of content items, the processing logic proceeds to block 545 where the processing logic identifies a portion of the first content item that is associated with the second content item. At block 546, the processing logic presents the identified portion of the first content item in the first GUI portion and at block 550 the processing logic presents the second content item in the second GUI portion. After block 550, the method 500 proceeds to block 570 where the processing logic determines whether additional user input is received. If additional user input is received, the method 500 proceeds back to block 525. If no additional user input is received, the method 500 ends.

Referring back to block 525, if the processing logic determines that the user input indicates that consumption of the first content item should be paused, the processing logic proceeds to block 555 where the processing logic pauses consumption of the first content item (e.g., the processing logic stops providing the first content item to the client device). At block 560, the processing logic receives user input indicating that the user wishes to un-pause the first content item. The processing logic resumes consumption of the first content item at block 565 (e.g., resumes providing the content item starting at the portion/time where the content item was paused or a current portion/time, as discussed above). After block 565, the method 500 proceeds to block 570 where the processing logic determines whether additional user input is received. If additional user input is received, the method 500 returns to block 525. If no additional user input is received, the method 500 ends.

FIG. 6 is a flow diagram illustrating a method 600 of presenting multiple content items, in accordance with another embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a content module, content sharing platform, and/or a server, as illustrated in FIG. 3.

Referring to FIG. 6 the method 600 begins at block 605 where the processing logic receives a first content item from a content sharing platform. At block 615, the processing logic receives action data (e.g., data indicative of a first user's actions with respect to additional content items, identifiers for the additional content items, start times and/or end times for the additional content items) from the content sharing platform. As discussed above, each of the one or more actions may be associated with one or more additional content items that the first content item may refer to. The processing logic also provides a GUI (block 620) for viewing the first content item and the one or more additional content items (e.g., a set of content items). As discussed above, the GUI may include a first GUI portion to present and/or display the first content item and a second GUI portion to display content items from the set of content items. The processing logic may perform one or more actions from the set of actions at block 621. For example, the processing logic may increase the volume for the playback of an additional content item from the set of content items. In another example, the processing logic may rewind an additional content item from the set of content items.

At block 625, user input is received from a user. The processing logic analyzes the user input and determines whether the user input indicates a first portion of the first content item. If the user input indicates the first portion of the first content item, the processing logic proceeds to block 630, where the processing logic provide the user input to the content sharing platform. At block 635, the processing logic receives the first portion of the first content item from the content sharing platform and presents the first portion of the first content item in the first GUI portion (as discussed above). At block 640 the processing logic receives the second content item from the content sharing platform and presents the second content item in the second GUI portion (as discussed above). After block 640, the method 600 proceeds to block 675 where the processing logic determines whether additional user input is received. For example, additional user input indicating another portion of the content item or indicating another content item may be received. If additional user input is received, the method 600 proceeds back to block 625. If no additional user input is received, the method 600 ends.

Referring back to block 625, if the processing logic determines that the user input indicates a second content item from the set of content items, the processing logic proceeds to block 645 where the processing logic provides the user input to the content sharing platform. At block 650, the processing logic receives the identified portion of the first content item from the content sharing platform and presents the identified portion of the first content item in the first GUI portion. At block 655 the processing logic receives the second content item from the content sharing platform and presents the second content item in the second GUI portion. After block 655, the method 600 proceeds to block 675 where the processing logic determines whether additional user input is received. For example, additional user input indicating another portion of the content item or indicating another content item may be received. If additional user input is received, the method 600 proceeds back to block 625. If no additional user input is received, the method 600 ends.

Referring back to block 625, if the processing logic determines that the user input indicates that consumption of the first content item should be paused, the processing logic proceeds to block 660 where the processing logic provides the user input to the content sharing platform. At block 665, the processing logic receives a second user input indicating that the user wishes to un-pause the first content item. The processing logic provides the second user input to the content sharing platform at block 670. After block 670, the method 600 proceeds to block 675 where the processing logic determines whether additional user input is received. If additional user input is received, the method 600 returns to block 625. If no additional user input is received, the method 600 ends.

Figure 7:
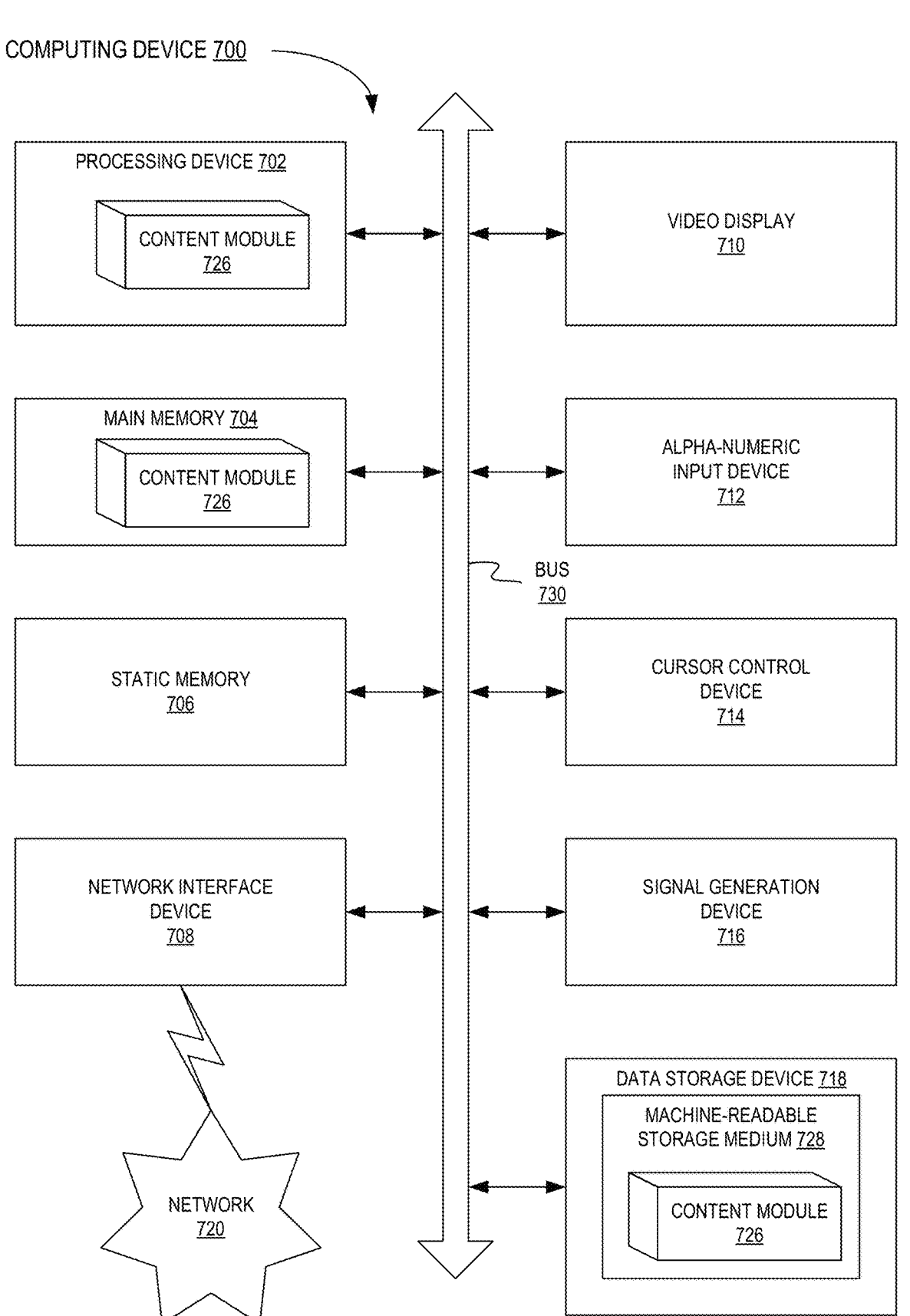
FIG. 7 is a block diagram of an example computing device that may perform one or more of the operations described herein.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute content module 726 for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions (e.g., content module 726) embodying any one or more of the methodologies or functions described herein. The content module 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "providing," "presenting," "generating," "pausing," "resuming," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving a first video content item from a first user device of a first user of a content sharing platform, wherein the first video content item references an additional video content item through one or more media-control actions performed by the first user on the first user device; and in response to a subsequent request of a second user of the content sharing platform for the first video content item hosted by the content sharing platform:

providing, for display in a graphical user interface (GUI) of a second user device of the second user, a first GUI portion having a first media player comprising a first set of media player controls to control playback of the first video content item and a second GUI portion having a second media player comprising a second set of media player controls to control playback of the additional video content item; and causing the one or more media-control actions to be automatically performed by the second media player with respect to the additional video content item in the GUI of the second user device in synchronization with playback of the first video content item by the first media player.

2. The method of claim 1, further comprising:

receiving action data indicative of the one or more media-control actions, wherein each action of the one or more media-control actions is associated with a corresponding first portion of the first video content item and a corresponding second portion of the additional video content item.

3. The method of claim 2, further comprising:

in response to an interaction of the second user with respect to a particular portion of the first video content item, causing, in the first GUI portion, the first video content item to begin playback at the particular portion of the first video content item, and causing, in the second GUI portion, the additional video content item to concurrently begin playback at the corresponding second portion of the additional video content item.

4. The method of claim 2, further comprising:

in response to an interaction of the second user with respect to a particular portion of the additional video content item, causing, in the first GUI portion, the first video content item to begin playback at the corresponding first portion of the first video content item, and causing, in the second GUI portion, the additional video content item to concurrently begin playback at the particular portion of the additional video content item.

5. The method of claim 1, wherein the one or more media-control actions comprise at least one of displaying, starting playback, pausing playback, fast forwarding, or rewinding.

6. The method of claim 1, wherein the one or more media-control actions were performed with respect to at least one of the first video content item or the additional video content item.

7. The method of claim 1, further comprising:

receiving action data indicative of a second set of one or more media-control actions performed by the first user on the first user device, wherein the action data is associated with a second additional video content item corresponding to a particular portion of the first video content item;

providing, for display in the GUI of the second user device, the first GUI portion to display the first video content item at the particular portion of the first video content item, and a third GUI portion to present the second additional video content item; and causing the second set of one or more media-control actions to be performed in the GUI of the second user device during playback of the first video content item.

8. A system for a first user device of a first user comprising:

a memory; and a processing device, coupled to the memory, to:

receive a first video content item from the first user device of the first user of a content sharing platform, wherein the first video content item references an additional video content item through one or more media-control actions performed by the first user on the first user device; and in response to a subsequent request of a second user of the content sharing platform for the first video content item hosted by the content sharing platform:

provide, for display in a graphical user interface (GUI) of a second user device of the second user, a first GUI portion having a first media player comprising a first set of media player controls to control playback the first video content item and a second GUI portion having a second media player comprising a second set of media player controls to control playback of the additional video content item; and cause the one or more media-control actions to be automatically performed by the second media player with respect to the additional video content item in the GUI of the second user device in synchronization with playback of the first video content item by the first media player.

9. The system of claim 8, wherein the processing device is further to:

receive action data indicative of the one or more media-control actions, wherein each action of the one or more media-control actions is associated with a corresponding first portion of the first video content item and a corresponding second portion of the additional video content item.

10. The system of claim 9, wherein the processing device is further to:

in response to a first interaction of the second user with respect to a first particular portion of the first video content item, cause, in the first GUI portion, the first video content item to begin playback at the first particular portion of the first video content item, and cause, in the second GUI portion, the additional video content item to concurrently begin playback at the corresponding second portion of the additional video content item; and in response to a second interaction of the second user with respect to a second particular portion of the additional video content item, cause, in the first GUI portion, the first video content item to begin playback at the corresponding first portion of the first video content item, and cause, in the second GUI portion, the additional video content item to concurrently begin playback at the second particular portion of the additional video content item.

11. The system of claim 8, wherein the one or more media-control actions comprise at least one of displaying, starting playback, pausing playback, fast forwarding, or rewinding.

12. The system of claim 8, wherein the one or more media-control actions were performed with respect to at least one of the first video content item or the additional video content item.

13. The system of claim 8, wherein the processing device is further to:

receive action data indicative of a second set of one or more media-control actions performed by the first user on the first user device, wherein the action data is associated with a second additional video content item corresponding to a particular portion of the first video content item;

provide, for display in the GUI of the second user device, the first GUI portion to display the first video content item at the particular portion of the first video content item, and a third GUI portion to present the second additional video content item; and cause the second set of one or more media-control actions to be performed in the GUI of the second user device during playback of the first video content item.

14. A non-transitory computer-readable storage medium comprising instructions, which when executed by a processing device of a user device of a user, cause the processing device of the user device to perform operations comprising:

receiving a first video content item from a first user device of a first user of a content sharing platform, wherein the first video content item references an additional video content item through one or more media-control actions performed by the first user on the first user device; and in response to a subsequent request of a second user of the content sharing platform for the first video content item hosted by the content sharing platform:

providing, for display in a graphical user interface (GUI) of a second user device of the second user, a first GUI portion having a first media player comprising a first set of media player controls to control playback of the first video content item and a second GUI portion having a second media player comprising a second set of media player controls to control playback of the additional video content item; and causing the one or more media-control actions to be automatically performed by the second media player with respect to the additional video content item in the GUI of the second user device in synchronization with playback of the first video content item by the first media player.

15. The non-transitory computer-readable storage medium of claim 14, wherein the operations further comprise:

receiving action data indicative of the one or more media-control actions, wherein each action of the one or more media-control actions is associated with a corresponding first portion of the first video content item and a corresponding second portion of the additional video content item.

16. The non-transitory computer-readable storage medium of claim 15, wherein the operations further comprise:

in response to an interaction of the second user with respect to a particular portion of the first video content item, causing, in the first GUI portion, the first video content item to begin playback at the particular portion of the first video content item, and causing, in the second GUI portion, the additional video content item to concurrently begin playback at the corresponding second portion of the additional video content item.

17. The non-transitory computer-readable storage medium of claim 15, wherein the operations further comprise:

in response to an interaction of the second user with respect to a particular portion of the additional video content item, causing, in the first GUI portion, the first video content item to begin playback at the corresponding first portion of the first video content item, and causing, in the second GUI portion, the additional video content item to concurrently begin playback at the particular portion of the additional video content item.

18. The non-transitory computer-readable storage medium of claim 14, wherein the one or more media-control actions comprise at least one of displaying, starting playback, pausing playback, fast forwarding, or rewinding.

19. The non-transitory computer-readable storage medium of claim 14, wherein the one or more media-control actions were performed with respect to at least one of the first video content item or the additional video content item.

20. The non-transitory computer-readable storage medium of claim 14, wherein the operations further comprise:

receiving action data indicative of a second set of one or more media-control actions performed by the first user on the first user device, wherein the action data is associated with a second additional video content item corresponding to a particular portion of the first video content item;

providing, for display in the GUI of the second user device, the first GUI portion to display the first video content item at the particular portion of the first video content item, and a third GUI portion to present the second additional video content item; and causing the second set of one or more media-control actions to be performed in the GUI of the second user device during playback of the first video content item.

\* \* \* \* \*